United States Patent
Wasserblat et al.

(10) Patent No.: US 9,711,167 B2
(45) Date of Patent: Jul. 18, 2017

(54) SYSTEM AND METHOD FOR REAL-TIME SPEAKER SEGMENTATION OF AUDIO INTERACTIONS

(75) Inventors: Moshe Wasserblat, Maccabim (IL); Tzachi Ashkenazi, Petach-Tikva (IL); Merav Ben-Asher, Pardessia (IL); Oren Pereg, Amikam (IL)

(73) Assignee: NICE Ltd., Ra'anana (IL)

( * ) Notice: Subject to any disclaimer, the term of this patent is extended or adjusted under 35 U.S.C. 154(b) by 768 days.

(21) Appl. No.: 13/419,340

(22) Filed: Mar. 13, 2012

(65) Prior Publication Data
US 2013/0246064 A1 Sep. 19, 2013

(51) Int. Cl.
*G10L 25/78* (2013.01)
*G10L 17/04* (2013.01)

(52) U.S. Cl.
CPC .............. *G10L 25/78* (2013.01); *G10L 17/04* (2013.01)

(58) Field of Classification Search
CPC ......... G10L 17/04; G10L 21/00; G10L 25/48; G10L 25/78
See application file for complete search history.

(56) References Cited

U.S. PATENT DOCUMENTS

| | | | |
|---|---|---|---|
| 6,766,295 B1* | 7/2004 | Murveit ................. | G10L 15/30 379/88.01 |
| 7,716,048 B2 | 5/2010 | Pereg et al. | |
| 8,930,179 B2* | 1/2015 | Chang ................. | G06N 99/005 704/255 |
| 2002/0087385 A1* | 7/2002 | Vincent ......................... | 705/10 |
| 2003/0139925 A1* | 7/2003 | Anderson ............ | G10L 15/065 704/231 |
| 2003/0191639 A1* | 10/2003 | Mazza ................. | G10L 15/183 704/231 |
| 2004/0249650 A1* | 12/2004 | Freedman et al. ................ | 705/1 |
| 2004/0260550 A1* | 12/2004 | Burges et al. ............... | 704/259 |
| 2005/0180547 A1* | 8/2005 | Pascovici ................... | 379/88.01 |
| 2009/0228268 A1* | 9/2009 | Kurata et al. ................. | 704/224 |
| 2010/0070276 A1* | 3/2010 | Wasserblat et al. .......... | 704/243 |
| 2011/0218798 A1* | 9/2011 | Gavalda ....................... | 704/201 |

* cited by examiner

*Primary Examiner* — Angela A Armstrong
(74) *Attorney, Agent, or Firm* — Pearl Cohen Zedek Latzer Baratz LLP

(57) ABSTRACT

A system and method for real-time processing a signal of a voice interaction. In an embodiment, a digital representation of a portion of an interaction may be analyzed in real-time and a segment may be selected. The segment may be associated with a source based on a model of the source. The model may updated based on the segment. The updated model is used to associate subsequent segments with the source. Other embodiments are described and claimed.

21 Claims, 6 Drawing Sheets

SYSTEM AND METHOD FOR REAL-TIME SPEAKER SEGMENTATION OF AUDIO INTERACTIONS

BACKGROUND OF THE INVENTION

Large organizations, such as commercial organizations, financial institutions, government agencies or public safety organizations conduct numerous interactions with customers, users, suppliers and the like on a daily basis. Many of these interactions are vocal, or at least comprise a vocal or audio component, for example, voices of parties to a phone call or the audio portion of a video or face-to-face interaction. A significant part of these interactions takes place between a customer and a representative of the organization, e.g., an agent in a contact center.

Various prior art systems and methods enable recording or otherwise capturing an audio portion of an interaction and, at a later stage (namely, in off-line mode) process captured portions. For example, U.S. Pat. No. 7,716,048 ('048) discloses a method of segmenting an audio interaction by associating anchor segments with parties to an interaction and associating additional segments the parties based on anchor segments.

As disclosed by the '048 patent, in order to select an anchor segment, segment a recorded interaction and associating segments with parties to an interaction, the interaction must first be recorded and the recorded interaction must be available to the segmentation process. Accordingly, prior art segmentation systems and methods are unsuitable for real-time speaker segmentation of audio interactions.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
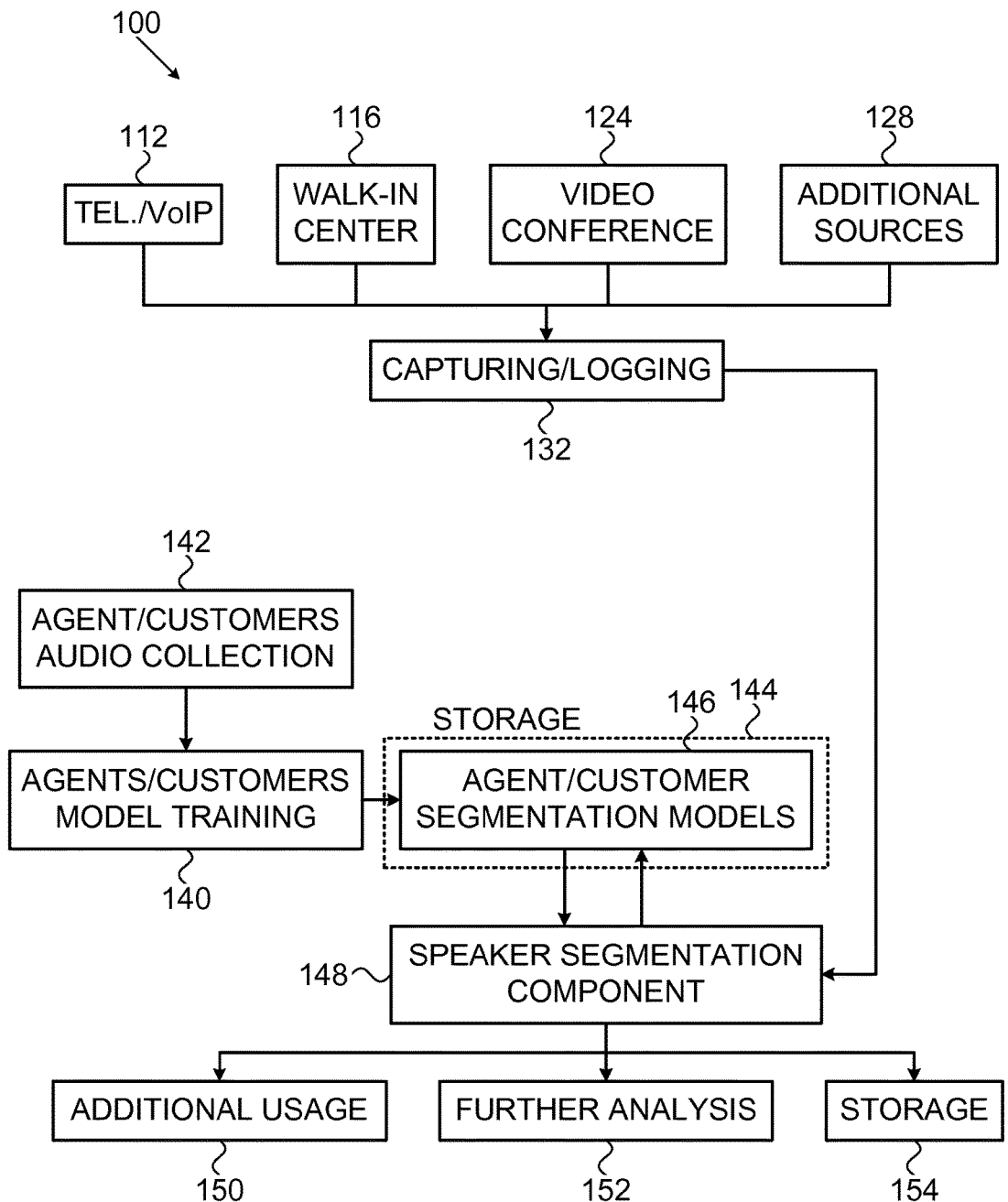
FIG. 1 is an exemplary block diagram of a system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1 which shows an exemplary block diagram of components of a system 100 according to embodiments of the invention. As shown, a system 100 may include a capturing and/or logging module 132 that may receive input from various sources as shown by telephone/VoIP 112, walk-in center 116, video conference 124 or additional sources 128. It will be understood that capturing and logging module 132 may receive any digital input produced by any component or system, e.g., any recording or capturing device. For example, any one of a microphone, a computer telephony integration (CTI) system, a private branch exchange (PBX), a private automatic branch exchange (PABX) or the like may be used in order to capture audio signals. As further shown, the system may include an audio collection module 142 that may collect and/or store agents and/or customers audio recordings, a model training module 140, a repository of segmentation models 146 and a speaker segmentation module 148. As shown, output of a system may be provided to analysis module 152 and/or to storage 154 and/or additional usage as shown by 150.

A typical environment where a system according to the invention may be deployed may be an interaction-rich organization, e.g., a call center, a bank, a trading floor, an insurance company or any applicable financial or other institute. Other environments may be a public safety contact center, an interception center of a law enforcement organization, a service provider, an internet content delivery company with multimedia search needs, a system for content delivery programs, or the like. Interactions captured and provided to system 100 may be any applicable interactions or transmissions, including broadcasts, interactions with customers or users or interactions involving organization members, suppliers or other parties.

Various data types may be provided as input to system 100. The information types optionally include auditory segments, video segments, textual interactions, and additional data. The capturing of voice interactions, or the vocal or auditory part of other interactions, such as video, may be of any form, format, and may be produced using various technologies, including trunk side, extension side, summed audio, separate audio, various encoding and decoding protocols such as G729, G726, G723.1, and the like. The interactions may be provided by modules 112, 116, 124 and 128 and captured by module 132. Vocal interactions may include telephone or voice over IP (VoIP) sessions, telephone calls of any kind that may be carried over landline, mobile, satellite phone or other technologies.

It will be appreciated that voice messages are optionally captured and processed as well, and that embodiments of the invention are not limited to two-sided conversations. Captured interactions may include face to-face interactions, such as those recorded in a walk-in-center, video conferences that include an audio component or any additional sources of data as shown by 128. Additional sources 128 may include vocal sources such as microphone, intercom, vocal input by external systems, broadcasts, files, streams, or any other source. Additional sources may also include non vocal sources such as e-mails, chat sessions, screen events sessions, facsimiles which may be processed by Object Character Recognition (OCR) systems, or others.

Data from all the above-mentioned sources and others may be captured and/or logged by capturing/logging module 132. Capturing/logging module 132 may include a set of double real-time buffers (RT-buffers). For example, a couple of RT-buffers may be assigned to each captured interaction or each channel. Typically, an RT-buffer stores data related to a certain amount of seconds, for example, an RT-buffer may store 4 seconds of real-time digitally recorded audio signal provided by one of modules 112, 116, 124 or 128.

In mono recording environments the audio signal contained in an RT-buffer may be a single audio stream that contains two (or even more) sides of a call or interaction, for example, the agent side and the customer side. In stereo recording environments the audio signal contained in the RT-buffer may be a dual audio stream, for example, a first audio stream may contain the agent side and a second audio stream may contain the customer side.

RT-buffers may be used for real time analysis including real time speaker segmentation. In mono environments, each RT-buffer's content may be transferred to the speaker segmentation component 148 upon it's filling completion. In order to maintain low real time delay, RT-buffers are preferably sent for analysis within a short period, typically several milliseconds from their filling completion. The double buffer mechanism may be arranged in a way that enables the filling of the second buffer while the first buffer is being transferred for analysis by speaker segmentation component 148. In other configurations, an RT-buffer may be allowed a predefined time for filling and may be provided when the predefined time lapses. Accordingly, an RT-buffer may be provided for processing every predefined period of time thus the real-time aspect may be maintained as no more than a predefined time interval is permitted between portions of data provided for processing by the system. For example, a delay of no more than 100 milliseconds may be achieved by allowing no more than 100 milliseconds of filling time for an RT-buffer. Accordingly, using two RT-buffers and counting time from zero, the first RT-buffer may be used for storing received audio signals during the first 100 milliseconds (0-100). In the subsequent 100 milliseconds (100-200), content in the first RT-buffer may be provided to a system while received audio signals are stored in the second RT-buffer. In the next 100 milliseconds (200-300) content in the second RT-buffer may be provided to a system while received audio signals are stored in the first RT-buffer and so on.

Capturing/logging module 132 may include a computing platform that may execute one or more computer applications, e.g., as detailed below. The captured data may optionally be stored in storage which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization. Storage 146 may store models, segmentation results, segmentation confidence scores or other data as detailed below and may be used in run-time for speaker segmentation.

In an embodiment, audio collection 142 may contain a collection of two subsets of audio signals. The first subset may contain recordings of agent side of audio interactions and the second subset may contain recordings of customer side of audio interactions. In some embodiments the first subset may include a unique agent identifier for each recording, an agent identifier may be referred to herein as agent ID. A second subset that may be included in audio collection 142 may include a unique customer identifier for each recording, a customer identifier may be referred to herein as customer ID.

Model training module 140 may use data in audio collection 142 in order to generate a universal background model (UBM) based on audio related to agents. A UBM may include any representation of voice characteristics of the agents in a contact center or organization. A UBM generated for an organization may include any parameters that may be used in order to identify an agent or representative of the organization. For example, a plurality of recordings of agent side of interactions may be used in order to generate a UBM that may represent a typical, average or representative agent in a contact center. For example, the voice characteristics of the agents and their communication channels acoustics in a specific contact center may be modeled in a UBM.

Communication channels acoustics in one location or organization may be different from the communication channels acoustics in another location, accordingly, a UBM generated for, and representing agents in, a first location or organization may be different from a UBM generated for, and representing agents in, a second location or organization. A customers UBM may be generated. For example, a customers UBM may include representations of noise or other acoustic features related to the phone lines used for contacting a contact center. Accordingly, a method according to embodiments of the invention may generate a first UBM or other model based on a plurality of recordings of agents and generate a second UBM or other model based on a plurality of recordings of customers.

In some embodiments, specific models may be generated. For example, models for specific agents may be generated and stored, e.g., in a dedicated or other storage. For example, a model representing a specific agent in a contact center may be generated and stored in module 146. Accordingly, when analyzing an interaction, specific models may be used. For example, if the identity of an agent participating in a call is known (e.g., based on metadata associated with the interaction, an extension number and the like) then a model specifically generated for the agent may be retrieved and used in order to identify portions of the call contributed by the agent.

Input to speaker segmentation component 148 may be an RT-buffer that may contain a recording of both sides of a call or interaction, e.g., the agent side and the customer side. Speaker segmentation component 148 may segment each RT-buffer. For example, Speaker segmentation component 148 may segment data in an RT-buffer to segments originated or produced by the agent and segments originated or produced by the customer. Speaker segmentation component 148 may produce indications, e.g., time marks that may be used in order to determine an association of segments with sources. As described herein, determination that an audio portion is to be associated with a specific speaker may be based on a calculated score. A score may be calculated by extracting feature vectors from an audio portion and calculating their respective probabilities given a model. In addition to the segmentation, confidence scores may be produced for each part or segment, indicating the level of confidence of the agent and customer segmentation of each part. Confidence scores may be calculated or determined by extracting feature vectors from the audio portion and calculating their respective probabilities given a model. The segmentation may be performed using the agent model and the customer model stored in Agent/Customer Models 146.

In addition to models generated by Agents/Customers Model Training 140, Agent/Customer Models 146 may use a current-agent model and current-customer model. These models may be used by the speaker segmentation component 148 during the segmentation of a specific interaction. A current-agent model may be produced at the begging of an interaction by copying the agent UBM and the current-customer model used at the begging of an interaction may be the customer UBM. In some embodiments if the agent-ID and/or the customer ID related to the processed interaction are known, then a specific agent model and/or a specific customer model may be used as the initial models.

Speaker segmentation component 148 may adapt the current-agent model and/or the agent model from time to time based on the accumulated segmented data and confidence scores of the current interaction. The adapted, modified or updated models may be stored in agent/customer models 146. The adapted models may be used by speaker segmentation component 148 for a segmentation of subsequent RT-buffers. Accordingly, a model may be updated or improved in real-time and the improved or updated model may be used, in real-time for segmenting subsequent audio signals.

The output of speaker segmentation component 148 and optionally additional data may preferably be sent to further analysis component 152 performing further analysis on classified audio portions. Further analysis or processing may include, but is not limited to, emotion detection, speech to text, word spotting, text analysis on the resulting text, call flow analysis, root cause analysis, link analysis, topic extraction, categorization, clustering, or the like. The further analysis may be based on the segmentation results, for example, different types of analysis may be performed on the agent side and on the customer side.

If the confidence level assigned by speaker segmentation component 148 is low, the audio signals may undergo processing which does not assume a particular side of the interaction. In such case, analysis may be performed on the summed signal or be limited to specific analyses types, e.g., an analysis whose performance does not degrade significantly when operated on a two-sided audio.

Output may optionally be transferred to additional usage components 150, if required. Such components may include playback components, report generation components, alert generation components, or others. The results may also be presented in any way the user prefers, including for example various graphic representations, textual presentation, table presentation, vocal representation, or the like, and may be transferred in any required method, including shown on a display, provided as a report etc. The output may also be presented by a dedicated user interface that may provide the ability to examine and listen to certain portions of interactions.

System 100 may include one or more computing platforms, executing components for carrying out the disclosed steps. System 100 may be or may include a general purpose computer such as a personal computer, a mainframe computer, or any other type of computing platform that may be provisioned with a memory device (not shown), a CPU or microprocessor device, and several I/O ports (not shown).

System 100 may include one or more collections of computer instructions, such as libraries, executables, modules, or the like, programmed in any programming language such as C, C++, C#, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figures 2A, 2B:
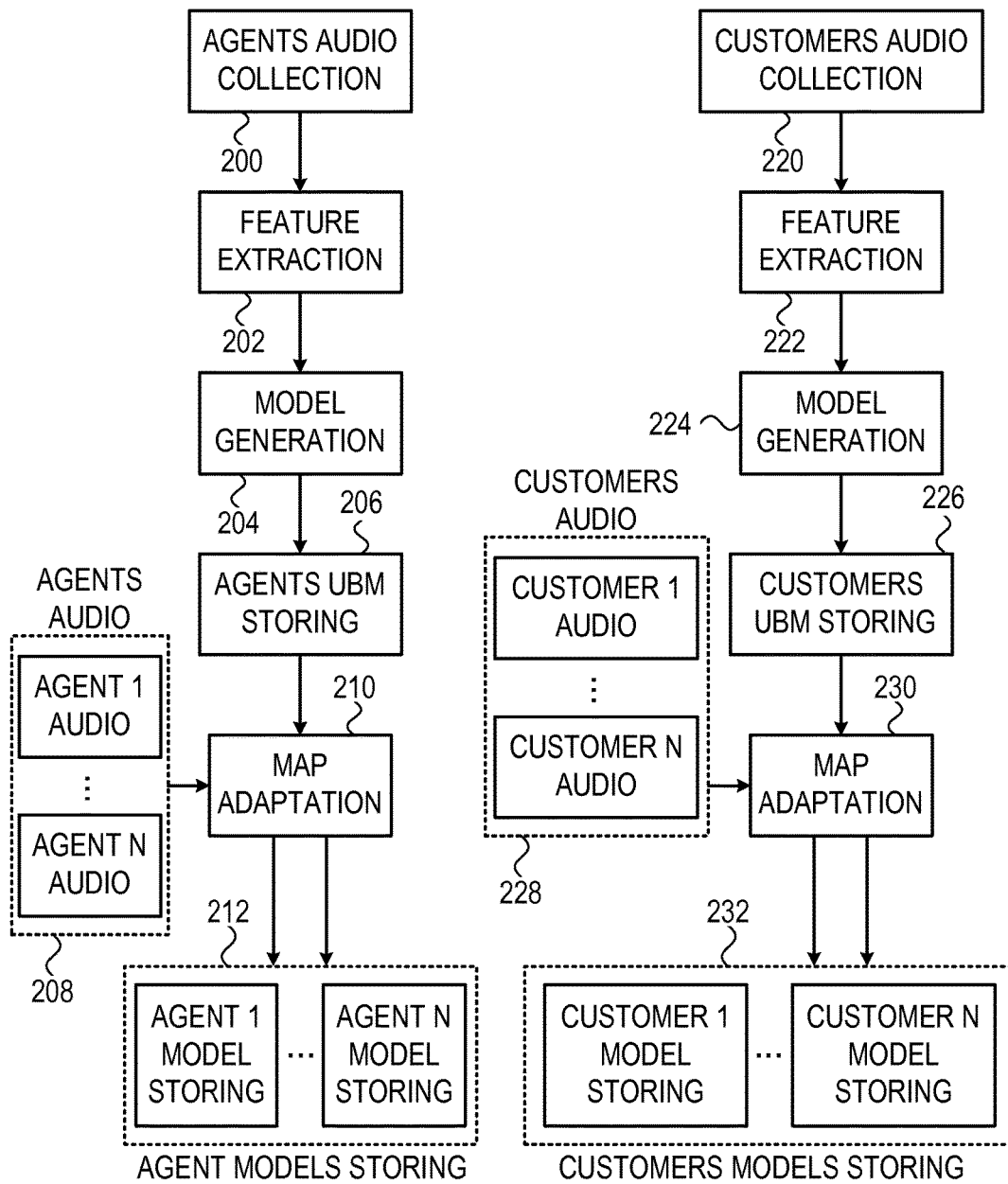
FIG. 2A shows exemplary flow according to embodiments of the invention.
FIG. 2B shows an exemplary flow according to embodiments of the invention.

Reference is made to FIG. 2A which shows a flow according to embodiments of the invention. The flow described herein with reference to FIG. 2A may be used to generate a universal background model (UBM) for agents. In some embodiments, the flow may alternatively or additionally be used to generate agents' speaker models.

Agents audio collection 200 may be a collection of audio signals. Each signal may be a recording of an agent side of an interaction. The collection preferably includes a good representation of the customer representatives employed in an organization, e.g., a contact center. Collection 200 is preferably collected before or at the first stages after system installation on site. Any system or method may be used in order to collect a plurality of recordings of agents' side of interactions.

Figure 2C:
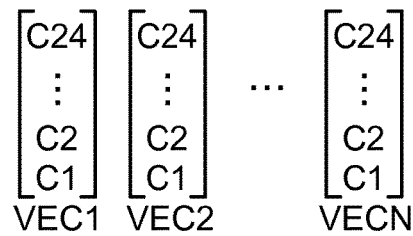
FIG. 2C shows an exemplary feature vectors memory layout according to embodiments of the invention.

At feature extraction 202, phonetic features such as Mel-frequency cepstral coefficients (MFCC) may be extracted from audio signals. In some embodiments cepstral coefficients or Fourier transform coefficients may be extracted from the audio signal. The features may typically be extracted from overlapping frames of 10 milliseconds of an audio signal. Reference is additionally made to FIG. 2C which shows a typical feature vectors memory layout structure extracted from one RT-buffer. As shown, a set of feature vectors may include N vectors of 24 MFCC coefficients.

As shown by model generation 204, agents audio collections may be used for generating a universal background model (UBM). The UBM may be a statistical representation of speech characteristics of a plurality of agents in an organization. The UBM may typically be a parametric gaussian mixture model of order 256. e.g., include 256 gaussians where each gaussian is represented in the model by three parameters, its weight, its mean and its variance. The three parameters may be determined using the feature vectors extracted by feature extraction 202 as input and further using known in the art algorithms, e.g., the K-means algorithm or the Expectation-maximization algorithm.

Figure 2D:
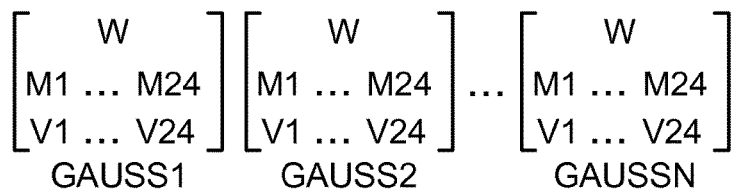
FIG. 2D shows a parametric speaker model structure according to embodiments of the invention.

Reference is additionally made to FIG. 2D which shows an exemplary parametric speaker model structure. As shown by FIG. 2D, W represents a gaussian weight, [M1 . . . M24] represent gaussian means vector, typically of 24 entries, where each entry represents the mean of a different MFCC coefficient and [V1 . . . V24] represent gaussian variances vector, typically of 24 entries where each entry represents the variance of a different MFCC coefficient.

As shown by 206, an agents' UBM may be stored in memory. The agents' UBM may be extracted for usage, e.g., as described herein. Agents' audio 208 may include a collection of pairs wherein each pair contains an audio signal recording of a specific agent and a unique identification of the agent (agent ID). Within each pair the audio signal recording may contain one or more interactions belonging to the same agent. The collection is preferably maintained such that a new audio signal is added for each new agent that joins the organization and deleted for retiring agents.

MAP adaptation 210 may generate a model for each agent that has an audio signal in Agents' audio 208. Each agent model may be generated by adapting or modifying the agents' UBM (e.g., stored as shown by 206) according to features extracted from audio signals in agents' audio 208. Accordingly, a specific model may be generated for each specific agent based on a recording of the agent and based on a background or general model that may be specific to the environment or organization in which the agent is employed.

Map adaptation 210 may include recalculating the UBM gaussian means using the following weighted average formula as shown below:

$$\mu_{adapted} = \left( \frac{\sigma * \mu_0 + \sum_n w(n)x(n)}{\sigma + \sum_n w(n)} \right)$$

Where:
μ adapted is the adapted mean value.
σ is the adaptation parameter that controls the balance between the prior mean value and the new value, σ may typically be in the range of 2-20.
$\mu_0$ may be the prior mean value, for example, μ may be the mean value initially set in the UBM as shown by model generation 204.
W(n) may be the weight of the Gaussian initially set in the UBM as shown by model generation 204.
X(n) may be the feature extracted from the agent audio 208.

The adaptation is preferably performed for relevant agents upon updating the audio signals recordings in agents audio 208. As shown by 212, agents' models may be stored, in memory or in a storage system, along or in association with their matching agent ID's. Accordingly, if an agent's ID is known, the relevant model may be retrieved and used, e.g., in a segmentation process as described herein.

Reference is made to FIG. 2B which shows a flow according to embodiments of the invention. The flow described herein with reference to FIG. 2B may be used to generate a universal background model (UBM) for customers. In some embodiments, the flow shown in FIG. 2B may alternatively or additionally be used to generate customers' speaker models. Customers audio collection 220 may include a collection of audio signals. Signals included in customers audio collection 220 may be recordings of customers side of interactions. The collection preferably includes a good representation of the customers of the call center. The collection is preferably collected before or at the first stages after a system according to embodiments of the invention is installed on site.

Audio signals in audio collection 220 may undergo feature extraction as shown by feature extraction 222. Models may be generated by model generation 224 and stored as shown by customer UBM storing 226. Generally, audio collection 220, feature extraction 222, model generation 224 and storing 226 may be respectively similar to audio collection 200, feature extraction 202, model generation 204 and storing 206 with agents replaced by customers where applicable.

Customer audio 228 may include a collection of pairs, each pair may contain an audio signal recording of a specific customer and a unique identification of the customer in the call center that may be referred to as a customer ID. Within each pair, the audio signal recording may contain one or more interactions belonging to the same customer. The collection is preferably maintained such that a new audio signal is added for each new customer of the organization. An audio signal may be added to an existing collection of recordings of a customer such that a plurality of recordings for a specific customer may be stored by a system.

As shown by map adaptation 230, a model may be generated for each customer that has an audio signal in customer's audio 228. A customer model may be generated by modifying the customer's UBM 226 according to features extracted from the relevant audio signal 228. The adaptation is preferably performed for relevant customers upon updating the audio signals recordings in customer's audio 228. As shown by 232, customer's models may be stored in memory along or in association with the matching customer ID. Accordingly, a customer model may be dynamically updated as recordings of the customer are obtained.

Figure 3:
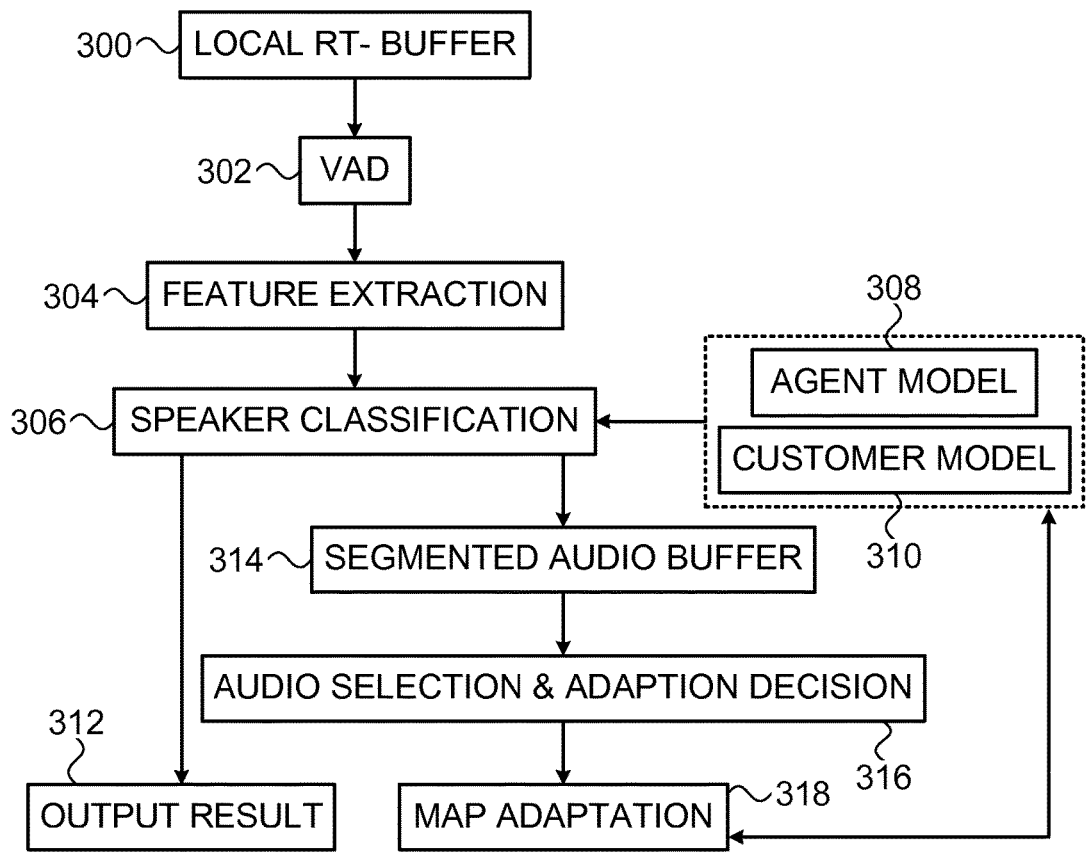
FIG. 3 shows an exemplary flow according to embodiments of the invention.

Reference is made to FIG. 3 which shows a flow according to embodiments of the invention. The flow described herein with reference to FIG. 3 may be used to perform real-time speaker segmentation of audio signals. Local RT-buffer 300 may be provided as input to a flow shown in FIG. 3. For example, local RT-buffer 300 may include audio signals captured by capturing and/or logging module 132 shown in FIG. 1.

Typically, a system may receive a new RT-buffer immediately upon buffer filling completion by the audio capturing and logging component 132. In other embodiments, a system may receive an RT-buffer every predefined interval. For example, providing an RT-buffer may be done each predefined interval so that the real-time aspect is maintained. In such case, an RT-buffer may be provided regardless of the amount of data it contains. For example, by providing an RT-buffer every 100 milliseconds, the system may be provided with data in substantially real-time.

In order to maintain low delay, the RT-buffer is preferably received within a short period, preferably a few milliseconds from the completion of the audio signal buffer recording. For example, two RT-buffers may be used such that while a first buffer is provided to the system as shown by 300, the second buffer is being filled with audio signals obtained from an interaction. When processing of data in the first RT-buffer is completed, the second RT-buffer is provided as shown by 300 and the first RT-buffer is used for further storage of audio signals obtained from an interaction. By configuring the two RT-buffers to have a relatively low capacity, a small delay may be achieved, thus audio signals may be processed in real-time.

As shown by voice activity detection (VAD) 302 voice activity may be detected. For example, inadequate parts of the audio, such as silent or noisy portions may be eliminated or excluded from processing, e.g., in order to leave only portions that contain speech. In some embodiments processing as shown by VAD 302 may include transforming recorded speech signals to the frequency domain, preferably by performing Fast Fourier Transform (FFT), and detecting areas in the signal that include pitch harmonics. The areas around the detected pitch harmonics may be classified as speech areas and the rest of the signal may be classified as non-speech.

As shown by feature extraction 304 phonetic features such as Mel-frequency cepstral coefficients (MFCC) may be extracted from the audio signal. In some embodiments cepstral coefficients or Fourier transform coefficients may be extracted from the audio signal. The features may typically be extracted from overlapping frames of 10 milliseconds of the audio signal. A typical feature vector memory layout structure extracted from one RT-buffer is shown in FIG. 2C.

At an initial stage, e.g., when audio signals in the first RT-buffer for an interaction are processed, the agent model as shown by 308 and customer model as shown by 310 may be the models stored as shown by 206 of FIG. 2A and/or 226 of FIG. 2B respectively. In case that the agent ID in the current interaction is known the specific agent model stored as shown by 212 of FIG. 2A may be used. In case the customer ID in the current interaction is known the specific customer model stored as shown by 232 in FIG. 2B may be used. Subsequently, when processing audio signals in subsequent RT-buffers, models 308 and 310 may be modified or updated based on processing of audio signals captured in relation to the current interaction.

As shown by speaker classification 306, an RT-buffer containing audio signals captured from an interaction may be sliced into frames, typically of one second in length. Each frame may be associated with a specific party or source. For example, a frame may be associated with an agent or with a customer participating in a call. Otherwise described, frames may be classified based on an analysis of audio signals included in the frame and based on a match of the analysis result with a model. For example, acoustic features may be extracted from a frame and the probability that the frame was uttered by the agent or by the customer may be determined based on the identified features and the agent and customer models. For example, a first probability score or value may be computed to represent the probability that an acoustic feature was produced by an agent. A second probability score or value may be computed, for the same acoustic feature, to represent the probability that the acoustic feature was produced by a customer.

Classification or association of frames may be performed by producing two scores for each frame or for each acoustic feature in a frame. Scores may be computed based on a model and by associating a probability with one or more acoustic features with respect to a frame. A first score, referred to herein as the agent score, may be produced based on one or more features in the frame and based on agent model 308. A second score, referred to herein as the customer score, may be produced based on features in the frame and based on customer model 310.

In order to produce a score for a frame, a specific acoustic or other feature in a frame may be extracted, next, a probability, weight or other metric for the feature may be determined by observing the metric associated with the feature in the model. The process may be repeated for some or all features identified in the frame and the frame score may be calculated according to some or all metrics determined as described herein. The process described herein may be repeated for the frame for each party to an interaction.

In some embodiments, if the score produced according to the agent model is higher than the score produced according to the customer model then the frame may be classified as an agent speaker frame. In some embodiments the agent score of the $N_{th}$ frame may be calculated by the following function:

$$Score_{agent}(n) = P(X(n)|M_{agent})$$

Where:
P(X|Y) is the conditioned probability of X given Y
X(n) are the feature vectors extracted from the n'th audio frame that resides in the local RT-buffer 300. Each feature vector typically includes a set of 24 coefficients of the MFCC transform produced by feature extraction module 304.
$M_{agent}$ is the agent model that resides in component 308
A customer score of the $N_{th}$ frame may be calculated by the following function:

$$Score_{customer}(n) = P(X(n)|M_{customer})$$

Where:
P(X|Y) is the conditioned probability of X given Y
X(n) are the feature vectors extracted from the n'th audio frame that resides in the local RT-buffer 300. Each feature vector typically includes a set of 24 coefficients of the MFCC transform produced by feature extraction module 304.
$M_{customer}$ is the customer model that resides in component 310

In addition to the classification of the frame, a confidence score may be calculated per frame. A high confidence score may represent a high probability that the classification decision is correct and vice versa. The confidence score may be calculated for example by the following equation:

$$Confidence(n) = a \log\left(\frac{Score_{agent}(n)}{Score_{customer}(n)}\right) + b$$

Where:
Confidence(n) is the confidence level of the n'th frame.
a,b are empirically set normalization factors
The confidence score may be clipped when higher than 1 and lower than 0.

As shown by segmented audio buffer 314, audio frames along with their respective classification labels (e.g., agent or customer) and the respective confidence levels may be stored thus accumulating a sequence of data from the beginning of the audio interaction until present time. As shown by Audio Selection and Adaptation Decision 316, accumulated audio frames along with their respective classification labels and confidence levels may be used for selecting the audio that will be used for updating, modifying or otherwise manipulating the agent model 308 and the customer model 310 as shown by MAP adaptation 318.

Figure 4:
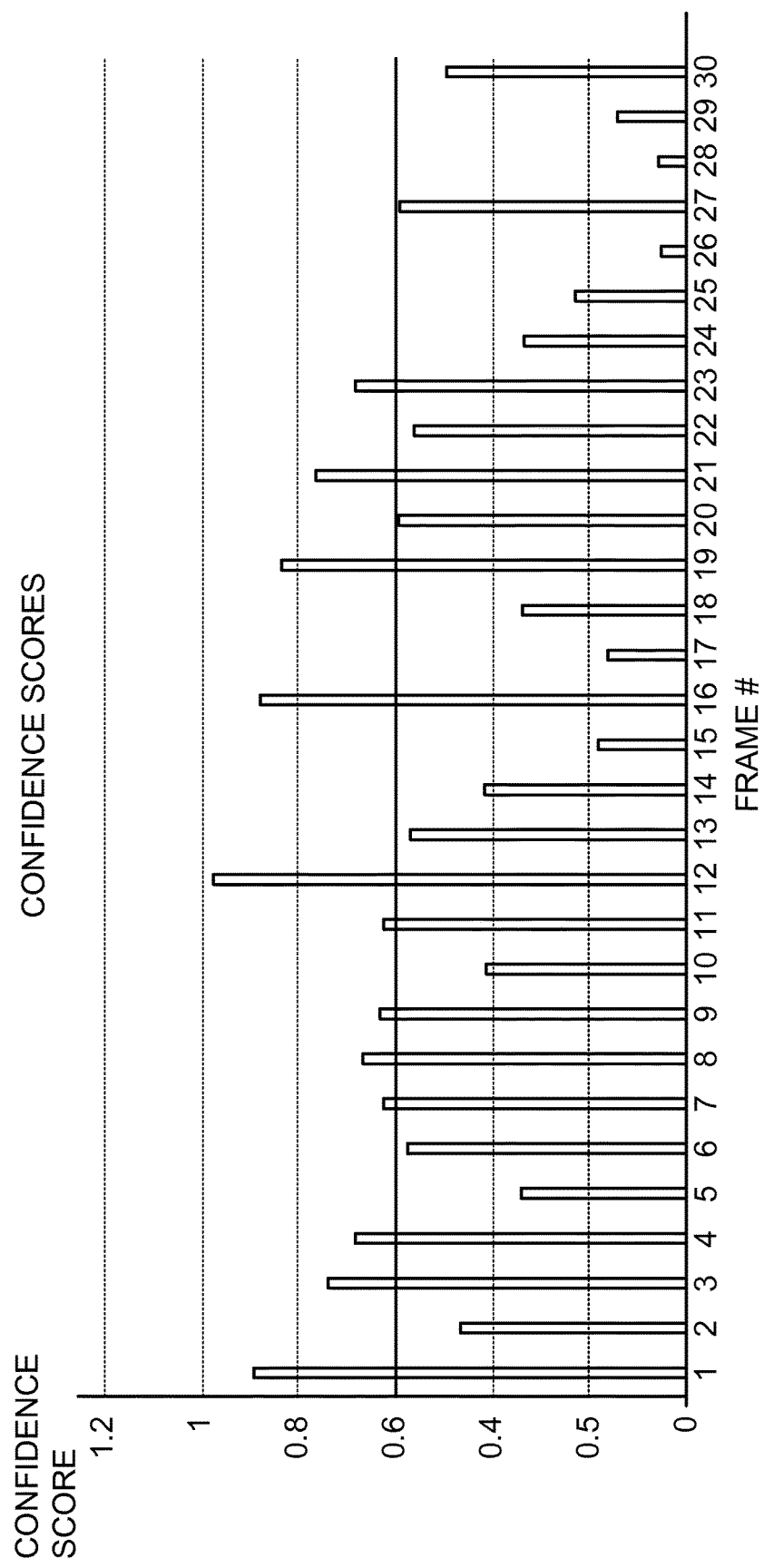
FIG. 4 is a graphical illustration of confidence scores according to embodiments of the invention.

In order to update, modify or adapt the agent and customer models as shown by map adaptation 318, the adaptation process may only use audio frames that were classified as agent and customer frames respectively and are further associated with a classification confidence that is higher than a predefined threshold. Reference is additionally made to FIG. 4 which shows an exemplary series of confidence scores where the threshold value is set to 0.6. As shown, only frame 1,3,4,7,8,9,16,19,21 and 23 are associated with scores that are higher than the 0.6 threshold, therefore, in one embodiment, the audio of the above mentioned frames will be used for updating or adapting the speaker model and the rest of the audio may not be used for the model adaptation.

In some embodiments selection of the audio frames that that will be used for adaptation of a model may be based on various computations. For example, audio frames may be sorted according to associated confidence levels in descending order and only a top percentile of the frames may be used. The percentage value may be based on a predefined value, e.g. 30%, or adaptive according to the amount of accumulated audio. Accordingly, map adaptation 318 may be controlled by audio selection and adaptation decision 316 that may select some of the frames as described herein and provide only the selected frames to map adaptation 318. By continuously selecting frames in real-time as described herein and modifying a model, in real-time, based on selected frames, the model may be improved continuously and in real-time such that it is better adapted to the specific agent or client participating in the current interaction.

Output result 312 may contain an indication of the classification result of each frame of the RT-buffer. This output along with the RT-buffer may be used for performing additional analysis such as word spotting, LVCSR or emotion detection on the agent side and/or on the customer side of the interaction. Output result 312 may be used for performing analysis on the summed audio and adding speaker side attribute to each spotted word or emotional event according to the speaker side indication.

Figure 5:
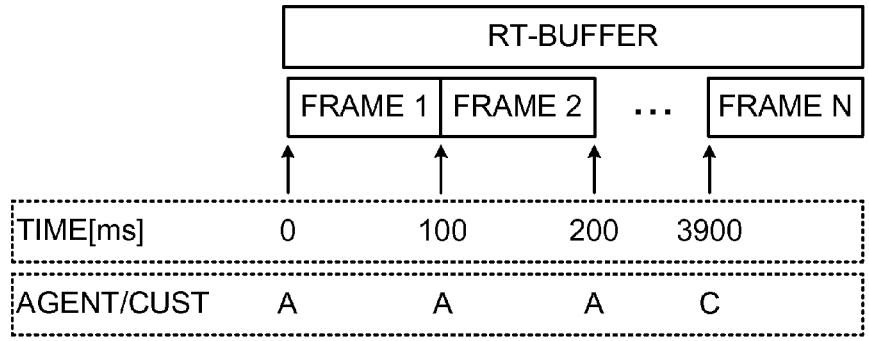
FIG. 5 is a graphical illustration related to confidence scores according to embodiments of the invention.

Reference is now made to FIG. 5 which graphically shows an illustration of an output data structure. As shown, frames in an RT-buffer may be indicated as "A" for agent or "C" for customer. As further shown, frames may be selected based on time and/or duration, e.g., frames may be selected as 100 milliseconds portions of the RT-buffer.

Figure 6:
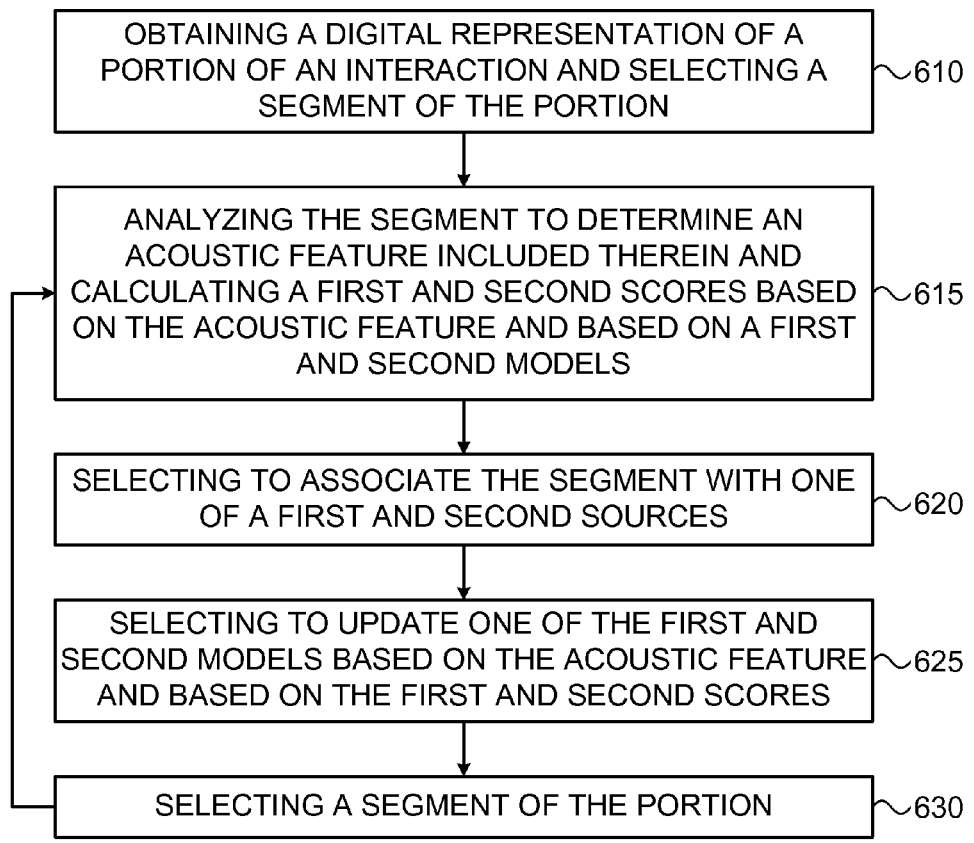
FIG. 6 is a flowchart describing a method according to embodiments of the invention.

Reference is now made to FIG. 6, which shows an exemplary flowchart according to embodiments of the invention. As shown by block 610, the method or flow may include obtaining a digital representation of a portion of an interaction and selecting a segment of the portion. For example, while an interaction is in progress, the audio content of the interaction may be routed or otherwise provided to a system that implements the flow shown in FIG. 6. In one example, a device, e.g., a private branch exchange (PBX) or a private automatic branch exchange (PABX) may be configured to forward audio content to a computing device that may implement the flow shown in FIG. 6 and described herein. For example, a conversation of a customer with an agent in a contact center may be forwarded to a computing device that may process the audio content of the conversation as described herein. In an embodiment, obtaining a digital representation of a portion of a voice interaction and selecting a segment of the portion may be done in real-time, namely, while the interaction is in progress. Real-time analysis of a portion of an interaction may include detecting voice activity. For example, audio signals related to a conversation may be analyzed to determine or identify sections where no speech is detected (e.g., when both an agent and a customer participating in a call are silent). In another case, a background noise level above a predefined level may be detected. Typically, analysis of a portion as shown by 610 may include identifying portions or segments that are suitable for further processing, e.g., portions including voices of an agent, a customer or other party to an interaction.

As shown by block 615, the method or flow may include analyzing the segment to determine, detect or identify an acoustic or other feature included therein and calculating a first and second scores based on the feature and based on a first and second models. It will be understood that although embodiments of the invention may calculate two scores based on an acoustic feature and two models, other configurations are possible. For example, some embodiments may calculate a single score based on a single model and select to associate the segment with a source if the score calculated meets a predefined criteria, e.g., the score is greater than a predefined value. Other embodiments may calculate three scores based on an acoustic feature and based on three models. It will be understood that any number of scores may be calculated for a segment based on any number of models. Accordingly, embodiments of the invention may be applicable to an interaction in which any number of parties are involved and a segment may be associated with a source or party selected from any number of sources or parties.

For example, an agent, a supervisor and a customer may participate in a conference call and segments of the call may be associated, in real-time, with any one of: the customer, the agent or the supervisor. For example, after a number of scores are calculated for a number of sources based on a respective number of models, a segment may be associated with the source for which the highest score is calculated. In other embodiments, a segment may only be associated with a source or a party to an interaction if the score meets a predefined criterion. Any combination of criteria may be applied, for example, in order to associate a segment with a party to a call, a score calculated for the segment may be required to be higher than all other scores (calculated for other parties) and further be greater than a predefined value.

Embodiments of the invention may select a model based on any information or parameter related to an interaction. For example, in order to calculate a score based on a model, the model may need to be obtained, referenced or selected. As described below, a plurality of models, e.g., from which one specific model is selected may be a plurality of models associated with a respective plurality of known sources. Accordingly, by selecting the correct model for a caller or source, embodiments of the invention may identify the source of an interaction. As described herein, a model may be selected or obtained in real-time, e.g., during an initial stage of an interaction. For example, based on at least one parameter related to a segment a model may be selected. For example, information such as caller ID (CID) or customer ID that may be received with an incoming call may be used.

A CID, agent ID or a similar parameter, e.g., a computer telephony integration (CTI) parameter for an agent may likewise be used, e.g., in order to associate the agent with a model. In an embodiment, a model of a customer may include, or be associated with, the CID of the customer. Accordingly, the CID may be used in order to locate or select the model of a customer. Any other parameter may be used for a selection of a model from a plurality of models.

In another embodiment, one or more segments may be analyzed produce an analysis result and a model may be selected from a plurality of models, possibly in real-time, based on the analysis result. For example, an analysis result may include one or more acoustic features that may be used in order to select a model, e.g., based on a probability score as described herein. For example, using an acoustic feature calculated as described herein, the probability that a segment is to be associated with each one of a plurality of models may be calculated and the model associated with the highest probability may be selected. Accordingly, embodiments of the invention may automatically associate a segment with a model thus automatically associating a source (e.g., a customer) with a model based on any information related to an interaction, e.g., voice.

In some cases, a source (e.g., caller or agent) may not be associated with a model. For example, a new customer who never called a contact center before may call the contact center for the first time. In such or other scenarios, embodiments of the invention may analyze one or more segments to produce an analysis result and may generate, in real-time, a model for a source (e.g., the new customer) based on the analysis result. Accordingly, models may be automatically generated for sources. A model automatically generated may be further associated with any relevant information, e.g., the CID of the new customer etc.

In yet other embodiments, a source may be identified by relating a model to a set of models. For example, an initial model may be generated (or updated) based on a few initial segments such that calculating a probability value for at least one acoustic feature is possible based on the model. Any other parameter usable in identifying a source may be included in an initial model. Using a parameter (e.g., related to an acoustic feature) in the initial model, a set of existing models may be searched for a matching model. For example, in cases where a reliable reference (e.g., a CID) is unavailable, embodiments of the invention may still maintain a model of a source and locate the model based on an initial model as described herein. In other cases, based on locating a model using an initial model as described herein, the same model may be used for a customer who may be calling the same contact center from a number of different phone numbers.

Determining an acoustic feature included in a segment as shown by block 615 may include identifying one or more acoustic attributes or parameters and/or compiling a feature vector as described herein. Calculating a score based on an acoustic feature and based on a model may include identifying or locating, in a model, a metric associated with the acoustic feature. For example, as described herein, a model may include a weight or other metric associated with an acoustic feature, accordingly, a score may be determined or calculated for each acoustic feature identified in a segment based on a weight or other metrics associated with the acoustic feature in the model. A number of scores for a single acoustic feature may be determined based on a number of models. For example, a first and second models may associate a first and second metric or value with the same acoustic feature, accordingly, a first and second scores may be calculated for the same acoustic feature based on two models. A score may be viewed as a probability metric or value. For example, given a specific acoustic feature identified in a segment and using a model of a specific agent, a score produced may represent the probability that the segment includes the voice of the specific agent.

As shown by block 620, the method or flow may include selecting to associate the segment with one of a first and second sources based on the first and second scores. For example, based on scores calculated for an agent and customer participating in a call, a segment may be associated with the agent or with the customer. For example, if the score calculated for a segment based on the agent model is higher than the score calculated for the same segment based on the customer model then the segment may be associated with the agent.

As shown by block 625, the method or flow may include selecting to update one of the first and second models based on the acoustic feature and based on the first and second scores. For example, if it is determined that a segment is to be associated with the customer then the customer model may be updated. Updating a model may include modifying any information in the model. For example, following an association of a segment with a customer based on a specific acoustic feature, the customer model may be updated such that information related to the specific acoustic feature is modified. Updating or modifying a model of a source according to features in segments associated with the source may thus improve the model such that it better represents the relevant source.

As shown by block 630, the method or flow may include selecting a segment of the portion. For example, following processing and associating a first segment as described with reference to blocks 610, 615, 620 and 625, a second segment may be selected, e.g., from an RT-buffer as described herein. As shown by the arrow connecting blocks 630 and 615, the flow may be repeated for the subsequent segment selected as shown in block 630. Accordingly, following an association of a segment with a source based on a model, the model may be updated based on information in the segment and may further be used to associate a subsequent segment with the source.

In some embodiments, an initial model may be generated based on one or more recordings. For example, a plurality of recordings of agents in a contact center may be used in order to generate an initial agent model and a plurality of customer recordings may be used to generate an initial customer model. For example, an initial agent model may include the background sounds or other acoustic features which are specific or typical to a specific contact center. Similarly, an initial customer model may include representations of words or other acoustic features typically originating at a customer side. An initial model may be modified, e.g., as described with reference to FIG. 6 such that it is improved in real-time, e.g., during a call. Accordingly, even if at an initial stage segments or portions of a call may not be associated with a party to a call or they may be associated according to a low confidence value, as the interaction progresses and models are iteratively and in real-time, are updated and improved, accuracy of classification and/or association of segments with speakers may be increased or improved.

For example, rather than updating or modifying a model based on a single segment substantially immediately after associating the segment with a related speaker as done in one embodiment, in another embodiment, a plurality of segments may be associated with a source or speaker according to a respective plurality of probability values and the model may be updated based on information in only some or a subset of the plurality of segments. For example, only segments associated with a confidence value, parameter or metric that is above a predefined value may be used for updating a model, e.g., only segments associated with a confidence metric, probability score or other parameter having a value above 0.6 as shown by FIG. 4.

As described herein, an initial model may be used when an interaction is established. For example, upon detecting a call is received from a customer in a contact center, a universal background model (UBM) may be used in order to identify segments. For example, during an initial phase of a call, an agent UBM may be used in order to associate segments with the agent and a customer UBM may be used in order to associate segments with the customer. However, other configurations and/or embodiments are possible.

For example, based on a result of an analysis of one or more segments, a model may be selected from a repository of models. For example, the first few segments in the first one or more portions of an interaction may be analyzed and one or more features may be identified. Based on features identified in the first segments, a model may be selected. In one embodiment, a repository of agents and/or customers models may be maintained and a system may automatically select a model based on identified acoustic or other features.

For example, a system may iteratively attempt (e.g., following analysis of each segment) to locate a model for a customer. In an embodiment, following an analysis of a segment, the system may determine the segment is to be associated with a customer, next, the system may use acoustic features identified in the segment in order to match the segment with a specific customer model stored in a repository. For example, a source or speaker may be identified by relating a model to a plurality of models associated with a respective plurality of known sources. Locating a model may be done by calculating an association probability value or score based on a segment and a candidate model. Locating or selecting a model may be done in real-time, e.g., a customer model may be selected while a call with the customer is in progress. A model located in real-time as descried herein may be used for associating subsequent segments, e.g., as described herein. It will be understood that a model may be located and selected in real-time for any one or more of: a customer, a caller, an agent or any party to an interaction.

In yet another embodiment, a model may be generated in real-time. For example, segments of a digital representation of a voice interaction may be analyzed to produce analysis results. Analysis results produced in real-time (e.g., identified acoustic features) may be used in order to generate a model in real-time. Accordingly, a system or method may use a number of segments (typically the first segments received) in order to generate a model for a speaker and use a model thus generated in order to associate subsequent segments with the speaker. Generating a model in real-time may be done as described herein. For example, statistical or other representations of any applicable aspects of speech or sound, e.g., values, scores or other parameters related to phonetic, acoustic or linguistic aspects may be calculated and incorporated in a model.

Figure 7:
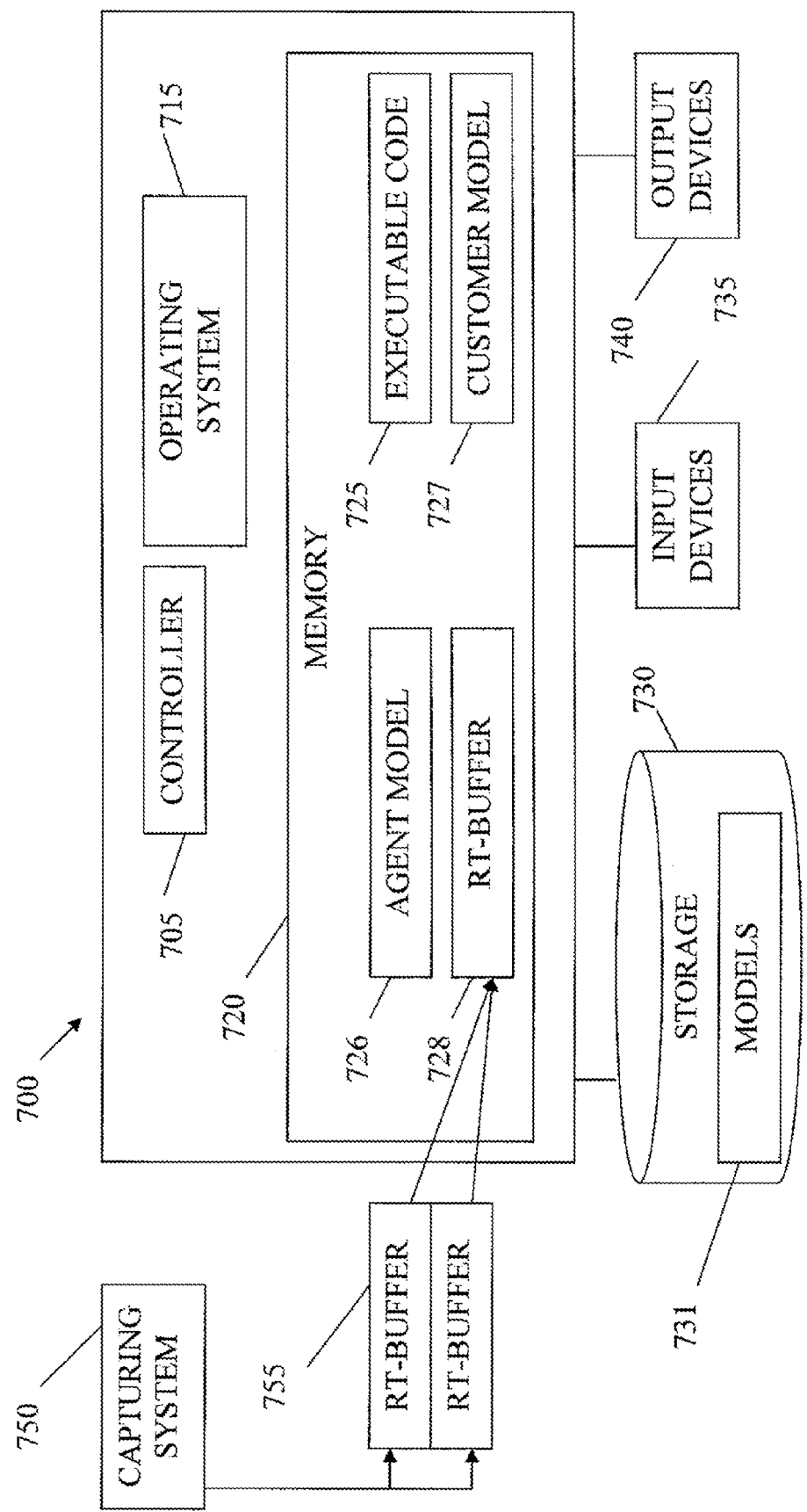
FIG. 7 shows high level block diagram of an exemplary system according to embodiments of the present invention.

Reference is now made to FIG. 7, showing a high level block diagram of an exemplary system and computing device according to embodiments of the present invention. Computing device 700 may include a controller 705 that may be, for example, a central processing unit processor (CPU), a chip or any suitable computing or computational device, an operating system 715, a memory 720, a storage 730, input devices 735 and output devices 740.

Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by controller 705 possibly under control of operating system 715. For example, executable code 725 may be an application that may be configured to segment audio signals as described herein. Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Models may be stored in storage 730 as shown by models 731 and may be loaded from storage 730 into memory 720 as shown by agent model 726 and customer model 727 where they may be used by controller 705, e.g., in order to process audio signals in RT-Buffer 728. As shown, a capturing system 750 may capture audio signals and store captured signals in RT-buffers 755. As shown, RT-buffers 755 may include two buffers. In some embodiments, more than two buffers may be used. For example, a number of interactions may be processed as described herein, and segments related to the interactions may be associated with parties to the interactions. In such scenario, two RT-buffers may be allocated for each interaction. In an embodiment, capturing system 750 may store data in one of RT-buffers 755 and, possibly at the same time, data from a second RT-buffer in RT-buffers 755 may be provided to device 700. For example, while data in one of the buffers shown by 755 is being copied into memory 720 capturing system 750 may store data in another one of buffers 755.

In another embodiment, capturing system 750, executable code 725 and/or controller 705 may have direct access to RT-buffers 728 and 755 such that by manipulating pointers, copying of data may not be required. For example, an additional memory unit possibly managed and/or controlled by a memory management unit (MMU) may be provided such that capturing system 750 and controller 705 may simultaneously access the memory unit. the MMU or other component may control access to the memory unit such that while controller 705 reads data from a first RT-buffer, capturing system 750 may write data to another RT-buffer. Any configuration allowing capturing system 750, executable code 725 and/or controller 705 to share RT-buffers 755 and/or 728 may be used such that filling RT-buffers 755 and/or 728 and processing data in RT-buffers 755 and/or 728 may be done concurrently. Executable code 725 may process data in RT-buffer 728 based on agent model 726 and/or customer model 727, for example, as described herein. Models 726 and 727 may be loaded from storage 730 as required. For example, models 731 stored in storage 730 as shown may be agents' models and/or customers' models.

When required, e.g., upon detecting an incoming call, the relevant model may be loaded into memory as shown by models 726 and 727. Although not shown, any output or result produced by device 700 may be stored in storage 730 or sent over a network, e.g., via output devices 740.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a workstation, a server computer, a Personal Digital Assistant (PDA) device, a tablet computer, a network device, or any other suitable computing device.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of associating a segment of a voice interaction with a speaker, the method comprising:
    generating a plurality of first models by, for each of a plurality of speakers:
        generating a first model used to identify the speaker based on analyzing one or more recordings of voice interactions that include the speaker, the first model comprising voice characteristics of the speaker;
    while a voice interaction different than a voice interaction used to generate a model is in progress:
        obtaining, by a controller, a digital representation of a portion of the voice interaction and selecting a segment therefrom;
        associating, by the controller, the segment with a specific speaker of the plurality of speakers based on a first model of the plurality of first models, the first model unique to the specific speaker;
        updating the first model based on the segment to produce an updated model; and
        using the updated model to associate a subsequent segment of the voice interaction with the specific speaker of the plurality of speakers; and
        wherein associating the segment with a speaker is performed when the identity of the speaker is unknown and comprises searching a set of models for a model matching the speaker, the matching based on an acoustic feature.

2. The method of claim 1, comprising:
    obtaining a second model related to a second speaker;
    calculating for the segment a first score and a second score based on the first and second models; and
    selecting to associate the segment with one of the first and second speakers based on the calculated scores.

3. The method of claim 2, wherein the first and second scores are calculated based on calculating one or more probabilities of a respective one or more acoustic features given the first and second models.

4. The method of claim 1, comprising iteratively and in real-time, updating the first model based on classified segments of the interaction.

5. The method of claim 1, wherein the segment is selected based on a voice activity detection performed on at least part of the portion.

6. The method of claim 1, comprising:
    determining at least one acoustic feature in the segment;
    calculating at least one probability value for the at least one acoustic feature based on the first model; and
    associating the segment with the speaker if the at least one probability value meets a predefined criteria.

7. The method of claim 6, comprising:
    associating a plurality of segments with the speaker according to a respective plurality of probability values; and updating the first model based on a subset of the segments, the subset selected based on the probability values.

8. The method of claim 1, comprising determining at least one parameter related to the segment and selecting the first model, in real-time, based on the at least one parameter.

9. The method of claim 1, comprising analyzing the segment to produce an analysis result and selecting the first model, in real-time, from a plurality of models based on the analysis result.

10. The method of claim 1, comprising analyzing the segment to produce an analysis result and generating the first model, in real-time, based on the analysis result.

11. The method of claim 1, comprising identifying the speaker by relating the updated model to a plurality of models associated with a respective plurality of known speakers.

12. The method of claim 1, comprising continuously improving the model while the second voice interaction is in progress such that the model is better adapted to associate segments of the interaction with the speaker.

13. An article comprising a non-transitory computer-readable storage medium, having stored thereon instructions, that when executed on a computer, cause the computer to:
generate a plurality of first models by, for each of a plurality of speakers:
generate a first model used to identify the speaker based on analyzing one or more recordings of voice interactions that include the speaker, the first model comprising voice characteristics of the speaker;
while a voice interaction different than a voice interaction used to generate a model is in progress:
obtain a digital representation of a portion of the voice interaction;
analyze the portion and select a segment therefrom;
associate the segment with a specific speaker of the plurality of speakers based on a first model of the plurality of first models, the first model unique to the specific speaker;
update the first model based on the segment to produce an updated model; and
use the updated model to associate a subsequent segment of the voice interaction with the specific speaker of the plurality of speakers; and
wherein associating the segment with a speaker is performed when the identity of the speaker is unknown and comprises searching a set of models for a model matching the speaker, the matching based on an acoustic feature.

14. The article of claim 13, wherein the instructions when executed further result in:
obtaining a second model related to a second speaker;
calculating for the segment a first score and a second score based on the first and second models; and
selecting to associate the segment with one of the first and second speakers based on the calculated scores.

15. The article of claim 14, wherein the first and second scores are calculated based on calculating one or more probabilities for a respective one or more acoustic features given the first and second models.

16. The article of claim 13, wherein the instructions when executed further result in iteratively and in real-time, updating the first model based on segments of the interaction.

17. The article of claim 13, wherein the segment is selected based on a voice activity detection performed on at least part of the portion.

18. The article of claim 13, wherein the instructions when executed further result in:
determining at least one acoustic feature in the segment;
calculating at least one probability value for the at least one acoustic feature based on the first model; and
associating the segment with the speaker if the at least one probability value meets a predefined criteria.

19. The article of claim 18, wherein the instructions when executed further result in
associating a plurality of segments with the speaker according to a respective plurality of probability values; and
updating the first model based on a subset of the segments, the subset selected based on the probability scores.

20. The article of claim 13, wherein the instructions when executed further result in analyzing the segment to produce an analysis result and selecting the first model, in real-time, from a plurality of models based on the analysis result.

21. The article of claim 13, wherein the instructions when executed further result in identifying the speaker by relating an initial model to a plurality of models associated with a respective plurality of known speakers.

* * * * *